US006979493B2

(12) United States Patent
Uchida et al.

(10) Patent No.: US 6,979,493 B2
(45) Date of Patent: *Dec. 27, 2005

(54) GAS BARRIER POLYURETHANE RESIN

(75) Inventors: Takashi Uchida, Osaka (JP); Tsutomu Tawa, Osaka (JP); Hiroyuki Shiraki, Osaka (JP)

(73) Assignee: Mitsui Takeda Chemical Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/410,273

(22) Filed: Apr. 10, 2003

(65) Prior Publication Data

US 2003/0207122 A1 Nov. 6, 2003

Related U.S. Application Data

(62) Division of application No. 09/619,639, filed on Jul. 19, 2000, now Pat. No. 6,569,533.

(30) Foreign Application Priority Data

Jul. 27, 1999 (JP) .................................. 11-211966
Jul. 13, 2000 (JP) ............................. 2000-212546

(51) Int. Cl.$^7$ ........................ B32B 27/06; B32B 27/10; B32B 27/12; B32B 27/40; C08G 18/74
(52) U.S. Cl. ............................. 428/423.1; 428/425.1; 428/425.5; 428/425.8; 428/425.9; 524/442; 524/591; 524/839; 524/840; 528/28; 528/44; 528/71; 528/85
(58) Field of Search ....................... 428/423.1, 425.1, 428/425.5, 425.8, 425.9; 524/442, 591, 839, 524/840; 528/44, 71, 28, 85

(56) References Cited

U.S. PATENT DOCUMENTS

| | | | |
|---|---|---|---|
| 3,352,830 A | 11/1967 | Schmitt ........................ 528/65 |
| 3,879,330 A | 4/1975 | Lustig ......................... 525/129 |
| 3,889,031 A | 6/1975 | Tatsumi et al. ............. 428/216 |
| 4,710,413 A | 12/1987 | Quack ........................ 428/36.6 |
| 4,880,592 A | 11/1989 | Martini et al. .............. 264/514 |
| 5,254,354 A | 10/1993 | Stewart ....................... 426/106 |
| 5,405,664 A | 4/1995 | Sirinyan et al. ........... 428/34.8 |
| 5,518,792 A | 5/1996 | Masuda et al. ............ 428/36.6 |
| 5,700,560 A | 12/1997 | Kotani et al. ................ 428/325 |
| 5,766,751 A | 6/1998 | Kotani et al. ............... 428/323 |
| 5,942,320 A | 8/1999 | Miyake et al. ............. 428/216 |
| 5,969,029 A | 10/1999 | Kotani et al. ................ 524/447 |
| 5,981,029 A | 11/1999 | Harada et al. .............. 428/143 |
| 6,015,583 A | 1/2000 | Krebs et al. ................ 426/396 |
| 6,569,533 B1 * | 5/2003 | Uchida et al. ........... 428/423.1 |

FOREIGN PATENT DOCUMENTS

| | | |
|---|---|---|
| EP | 0 906 944 | 4/1999 |
| JP | 49-41469 | 4/1974 |
| JP | 62-179935 | 8/1987 |
| JP | 1-252631 | 10/1989 |
| JP | 4-345841 | 12/1992 |

OTHER PUBLICATIONS

Database WPI, Week 9551, Derwent Publications Ltd., London, GB; AN 1995-401017, XP002175404 "Thermoplastic Polyurethane"& JP 07 278249 A (Sekisui Chem Ind), Oct. 24, 1995 *abstract*.

Database WPI, Week 9635, Derwent Publications Ltd., London, GB; AN 1996-350251, XP002175405 "Gas Barrier Laminated Matter for Packing Material"& JP 08 165366 A (Nippon Shokubai), Jun. 25, 1996 *abstract*.

M. Salame et al., "Prediction of Gas Barrier Properties of High Polymers", Polymer Engineering and Science, vol. 26, No. 22, Dec. 1986.

* cited by examiner

*Primary Examiner*—Rabon Sergent
(74) *Attorney, Agent, or Firm*—Wenderoth, Lind & Ponack, L.L.P.

(57) ABSTRACT

A polyurethane resin having a total concentration of the urethane group and the urea group of not less than 15% by weight is prepared by reacting a diisocyanate component (e.g., an aromatic diisocyanate) with a diol component (e.g., a C2–8alkylene glycol). The repeating unit of the polyurethane resin may contain a constitutive unit of an aromatic or alicyclic compound. The polyurethane resin may be shaped into a film for use as a gas barrier film. The film may be a gas barrier composite film composed of a base film layer and a resin layer at least comprising the polyurethane resin. The present invention provides a polyurethane resin excellent in gas barrier properties against water vapor, oxygen, aromatics, and others, and a film containing the same.

11 Claims, No Drawings

GAS BARRIER POLYURETHANE RESIN

This application is a divisional of Ser. No. 09/619,639 filed Jul. 19, 2000, now issued as U.S. Pat. No. 6,569,533.

FIELD OF THE INVENTION

The present invention relates to a gas barrier polyurethane resin which is useful as a film, a sheet, or a molding material excellent in gas barrier properties against water vapor, oxygen, aromatics, and others, and in adhesion to a base film, and to a gas barrier film using the same.

BACKGROUND OF THE INVENTION

Gas barrier films and packaging materials using the same are already well known. Of these, although aluminum foil is known to have the most excellent oxygen gas barrier properties, it cannot be used as it is but for special uses, for its pinhole resistance is too weak. Therefore, the aluminum foil is mostly used as an intermediate layer of a laminated film. The gas barrier properties of the laminated film are far excellent, but the film is opaque and therefore an object contained therein cannot be observed therethrough, hence difficulty in judging whether the film has surely been heat-sealed or not.

As the oxygen gas barrier film, films of polyvinylidene chlorides or vinylidene chloride copolymers (hereinafter referred to simply as PVDC) and PVDC-coated films are well known. Particularly, PVDC-coated films are known as laminated films with excellent barrier properties against oxygen gases and water vapor. PVDC hardly absorbs moisture and can exhibit its good gas barrier properties even under conditions of high humidity. Therefore, a variety of base films, on which a layer of PVDC is coated, can be employed regardless of their moisture permeability. Examples of the base film include biaxially stretched films of polypropylene, nylon, or of polyethylene terephthalate, and cellophane. Taking advantage of their gas barrier properties, these laminated films are utilized for wrapping or packing of a variety of foods, regardless of their being dry or moisture-laden. These packaging materials, after being used, are disposed as non-industrial, domestic wastes from homes. These wastes when incinerated give off toxic and hazardous gases and, what is worse, are causes of highly carcinogenic chlorine-containing organic compounds generated upon incineration at low temperatures. For such reasons, transition to the use of other materials has strongly been desired. However, the reality is that alternatives with performance and cost-performance equivalent to those of PVDC are not yet found.

For example, as the oxygen-gas barrier film, a polyvinyl alcohol (PVA)-series film is also well known. Only if the degree of its moisture absorption is low does the PVA film show extraordinarily excellent gas barrier properties against oxygen. However, the PVA film is originally high in moisture absorption, and its gas barrier properties against oxygen are immediately deteriorated upon exposure to an environment with a relative humidity of 70% or higher. Therefore, the PVA film has been considered to be lacking in practicality. For improving the moisture absorption of PVA, there has been proposed a copolymerization of PVA with ethylene into ethylene.vinyl alcohol copolymer (EVOH), a polycondensation with alkoxysilane by the sol-gel method [Japanese Patent Application Laid-Open No. 345841/1992 (JP-A-4-345841)], and a modification of part of the alcohol of PVA to make it water-resistant. However, none of the methods provides resins with satisfactory performance.

Moreover, although there have been suggested that a polyamide film obtained by reacting an aliphatic dicarboxylic acid with 4,4'-methylene bis(phenylisocyanate) shows excellent gas barrier properties and thermal resistance [Japanese Patent Application Laid-Open No. 252631/1989 (JP-A-1-252631)] and that a polyallyl alcohol-containing aqueous dispersion for gas barrier coating and a multilayered structure having a layer made therefrom exhibit excellent gas barrier properties and transparency [Japanese Patent Application Laid-Open No. 140072/1998 (JP-A-10-140072)], they are still unsatisfactory in their gas barrier properties under conditions of high humidity and water resistance.

There have been produced films with high oxygen-gas barrier properties, which are made by depositing an inorganic oxide such as silicon oxide [Japanese Patent Publication No. 12953/1978 (JP-B-53-12953)] and aluminium oxide [Japanese Patent Application Laid-Open No. 179935/1987 (JP-A-62-179935)] on a film. Since such inorganic oxide-made film is fabricated through a physical or chemical deposition process, the base film thereof itself is required to be deposition-durable, and therefore only to a limited variety of base film materials can be adopted. In addition, as these films are made of inorganic oxides, they are inferior in flexibility and tend to crack in the course of their secondary processing, possibly resulting in the degradation of the gas barrier properties.

SUMMARY OF THE INVENTION

An object of the present invention is to provide a polyurethane resin that shows extraordinarily excellent gas barrier properties against water vapor, oxygen, aromatics, etc., and a film containing the same.

Another object of the present invention is to provide a polyurethane resin which exhibits significantly good gas barrier properties particularly even under conditions of high humidity, and a film containing the same.

Still another object of the present invention is to provide a polyurethane resin having no fear of contaminating the environment and excellent in water-resistance and adhesion to a base film, and a film containing the same.

The inventors of the present invention made intensive and extensive studies to solve the above-mentioned problems, and finally found that a film material having remarkably good gas barrier properties and no fear of contaminating the environment can be obtained by using a polyurethane resin having specific urethane group and urea group concentrations. The present invention was accomplished based on the above findings.

That is, in the gas barrier polyurethane resin of the present invention, the total concentration of the urethane group and the urea group is not less than 15% by weight. The gas barrier properties of the polyurethane resin are excellent and its oxygen permeability is, at a thickness of 25 $\mu$m, 50 ml/m$^2$·atm·day or less. In addition, the humidity-dependency of the polyurethane resin is low, and the ratio of the oxygen permeability at 50% RH relative to that at 90% RH is about 1/1 to 1/2. The repeating unit of the polyurethane resin may contain a hydrocarbon ring as a unit (e.g., a ring derived from an aromatic or alicyclic compound).

Such polyurethane resin can be prepared from, e.g. an aromatic, aliphatic aralphatic, or alicyclic diisocyanate as its diisocyanate component, and a $C_{2-8}$alkylene glycol as its diol component. Examples of the diisocyanate component are any isomers of xylylene diisocyanate and hydrogenated xylylene diisocyanate. The proportion of the hydrocarbon ring in the repeating unit of the polyurethane resin is about 10 to 70% by weight. Into the gas barrier polyurethane resin may be added a silane coupling agent, a layered inorganic compound, and others. Regarding what form the gas barrier polyurethane resin is in, it may be in the form of an aqueous dispersion. Moreover, the layered inorganic compound may be a water-swellable one.

The present invention also includes a gas barrier film comprising a resin layer containing the above polyurethane resin. This film may be a single-layered gas barrier film, such as a single-layered film formed from the aforementioned polyurethane resin, or may be a gas barrier composite film comprising a base film layer and a resin layer at least comprising the aforementioned polyurethane resin. In the composite film, at least one side of the base film may be provided with an inorganic layer.

DETAILED DESCRIPTION OF THE INVENTION

The polyurethane resin of the present invention can be obtained by a urethanizing reaction of a diisocyanate component and a diol component (if necessary, a diol component and a diamine component).

[Diisocyanate Component]

Examples of the diisocyanate component include aromatic diisocyanates, araliphatic diisocyanates, alicyclic diisocyanates, and aliphatic diisocyanates.

Exemplified as the aromatic diisocyanate are m- or p-phenylene diisocyanate and its mixtures, 4,4'-diphenyl diisocyanate, 1,5-naphthalene diisocyanate (NDI), 4,4'-, 2,4'- or 2,2'-diphenylmethane diisocyanate and its mixtures (MDI), 2,4- or 2,6-tolylene diisocyanate and its mixtures (TDI), 4,4'-toluidine diisocyanate (TODI), 4,4'-diphenylether diisocyanate.

Exemplified as the araliphatic diisocyanate are 1,3- or 1,4-xylylene diisocyanate and its mixtures (XDI), 1,3- or 1,4-tetramethylxylylene diisocyanate and its mixtures (TMXDI), and ω,ω'-diisocyanate-1,4-diethylbenzene.

Exemplified as the alicyclic diisocyanate are 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate; IPDI), 4,4'-, 2,4'-, or 2,2'-dicyclohexylmethane diisocyanate and its mixtures (hydrogenated MDI), methyl-2,4-cyclohexane diisocyanate, methyl-2,6-cyclohexane diisocyanate, and 1,3- or 1,4-bis(isocyanatemethyl)cyclohexane and its mixtures (hydrogenated XDI).

Exemplified as the aliphatic diisocyanate are trimethylene diisocyanate, tetramethylene diisocyanate, hexamethylene diisocyanate (HDI), pentamethylene diisocyanate, 1,2-propylene diisocyanate, 1,2-, 2,3-, or 1,3-butylene diisocyanate, 2,4,4- or 2,2,4-trimethylhexamethylene diisocyanate, and 2,6-diisocyanatemethyl caproate.

Among these examples of the diisocyanate component, for example, TDI, MDI, and NDI are preferred as the aromatic diisocyanate; XDI and TMXDI as the araliphatic diisocyanate; IPDI, hydrogenated XDI, and hydrogenated MDI as the alicyclic diisocyanate; and HDI as the aliphatic diisocyanate. In view of gas barrier properties, aromatic diisocyanates (e.g., TDI, MDI, NDI), araliphatic diisocyanates (e.g., XDI, TMXDI), alicyclic diisocyanates (IPDI, hydrogenated XDI, hydrogenated MDI) are preferable, with aromatic diisocyanates (e.g., MDI), araliphatic diisocyanates (e.g., XDI), and alicyclic diisocyanates (e.g., hydrogenated XDI) particularly preferred. In the case of a diisocyanate component having a substituent in the ring, the side chain of an aromatic or alicyclic ring is preferably short (e.g., $C_{1-3}$ alkyl group), and it is preferred that the diisocyanate component is structurally symmetric.

These diisocyanates can be used either singly or in combination. If necessary, the diisocyanate component is used together with a polyisocyanate having three or more than three functional groups.

[Diol Component]

The diol component refers to a wide range of diols from low-molecular diols to oligomers, such as $C_{2-12}$alkylene glycols (e.g., ethylene glycol, 1,3- or 1,2-propylene glycol; 1,4-, 1,3-, or 1,2-butanediol; 1,5-pentanediol; 3-methyl-1,5-pentanediol; 2,4-diethyl-1,5-pentanediol; 2,2,4-trimethylpentane-1,3-diol; 1,6-hexanediol; neopentyl glycol; 1,5- or 1,7-heptanediol; 1,8-octanediol; 1,9-nonanediol, 1,10-decanediol, 1,11-undecanediol, 1,12-dodecanediol); polyetherdiols such as polyoxy$C_{2-4}$alkylene glycols (e.g., diethylene glycol, triethylene glycol, tetraethylene glycol, pentaethylene glycol, hexaethylene glycol, heptaethylene glycol, dipropylene glycol, tripropylene glycol, tetrapropylene glycol, pentapropylene glycol, hexapropylene glycol, heptapropylene glycol, dibutylene glycol, tributylene glycol, tetrabutylene glycol); aromatic diols (e.g., bisphenol A, bishydroxyethyl terephthalate, catechol, resorcin, hydroquinone, 1,3- or 1,4-xylylenediol and its mixtures); alicyclic diols (e.g., hydrogenated bisphenol A, hydrogenated xylylenediol, cyclohexanediol, cyclohexanedimethanol); polyesterdiols (e.g., addition products of the low-molecular diols and lactones, reaction products of the low-molecular diols and dicarboxylic acids).; and polycarbonatediols (e.g., reaction products of the low-molecular diols and short-chain dialkyl carbonates).

The molecular weight of the diol component is usually about 50 to 600, preferably about 50 to 300, and more preferably about 60 to 200.

Of these diols, in view of gas barrier properties, a low-molecular diol such as a $C_{2-8}$diol (e.g., ethylene glycol, propylene glycol, butanediol, pentanediol, hexanediol, heptanediol, octanediol, diethylene glycol, triethylene glycol, tetraethylene glycol, dipropylene glycol) is usually used, and a $C_{2-6}$diol (particularly, ethylene glycol, 1,2- or 1,3-propylene glycol, 1,4-butanediol, 1,6-hexanediol, 3-methyl-1,5-pentanediol, diethylene glycol, triethylene glycol, dipropylene glycol) is preferably employed.

These diols can be used either singly or in combination. If needed, a polyol having three or more than three functional groups can be used together with the diol component(s).

[Diamine Component]

If necessary, a diamine component may be used as a chain-extending agent or a crosslinking agent. Examples of the diamine are hydrazine, aliphatic diamines (e.g., ethylenediamine, trimethylenediamine, tetramethylenediamine, pentamethylenediamine, hexamethylenediamine, 2,2,4-trimethylhexamethylenediamine, 2,4,4-trimethylhexamethylene diamine, octamethylenediamine); aromatic amines (e.g. m- or p-phenylenediamine, 1,3- or 1,4-xylylenediamine or its mixtures); and alicyclic diamines [e.g., hydrogenated xylylenediamine, bis(4-aminocyclohexyl)methane, isophoronediamine, bis(4-amino-3-methylcyclohexyl)methane]. In addition to these compounds, diamines having a hydroxyl group, such as 2-hydrazinoethanol and 2-[(2-aminoethy)lamino]ethanol, are also available.

Of these diamines enumerated above, in view of gas barrier properties, a low-molecular diamine having 8 or less carbon atoms is usually employed, and preferaly used is a diamine having 6 or less carbon atoms (particularly, hydrazine, ethylenediamine, tetramethylenediamine, pentamethylenediamine, hexamethylenediamine, 2-hydrazinoethanol, 2-[(2-aminoethyl)amino]ethanol).

These diamines can be used either singly or in combination. If needed, a polyamine having three or more than three functional groups may be used together with the diamine component.

[Production Process]

As a process of producing the polyurethane resin, a method commonly employed, such as reactions in an organic solvent, can be utilized. There is no particular restriction as to the organic solvent provided that it is inert to the reaction, and examples of which are ethers (e.g., tetrahydrofuran, dioxanes); ketones (e.g., acetone, methyl ethyl ketone); aromatic hydrocarbons (e.g., toluene, xylene); nitriles (e.g., acetonitrile); carbonates (e.g., dimethyl carbonate, diethyl carbonate); amides (e.g., dimethylformamide, dimethylacetamide); and sulfoxides (e.g., dimethyl sulfoxide). These organic solvents can be used either singly or in combination. As the organic solvent, a solvent in which a polyurethane resin can dissolve is usually employed. Moreover, in the urethanizing reaction, if necessary, preparation processes for polyurethane catalyst such as amines, tin compounds, or lead compounds can be used.

As regards the proportions of the diisocyanate component and the diol component (in the case where the diamine component is used, the sum of the diol component and the diamine component), the amount of the diol component (the diol component and the diamine component) can be selected within the range of about 0.5 to 1.5 mol, preferably about 0.7 to 1.3 mol, and more preferably about 0.85 to 1.15 mol relative to 1 mol of the diisocyanate.

The polyurethane resin may be in the form of a solution with an organic solvent selected from those mentioned above, an aqueous solution, or an aqueous dispersion. The aqueous dispersion of the polyurethane resin can be prepared by emulsifying and dispersing a polyurethane prepolymer and then extending the chain of the prepolymer using, e.g., a diamine as a chain-extending agent.

In the case of a polyurethane prepolymer having no hydrophilic group, an aqueous dispersion is usually prepared by emulsifying the prepolymer using an emulsifying agent and then extending its chain by a chain-extending agent.

Exemplified as the emulsifying agent are protective colloids of the water-soluble polymer type such as polyvinyl alcohol, cellulose derivatives (e.g., carboxymethylcellulose), gelatin, and dextrin; nonionic surfactants such as polyoxyethylene $C_{8-20}$alkylphenyl ethers typified by polyoxyethylene nonylphenyl ether, and polyoxyethylene-oxypropylene block copolymer; and anionic surfactants such as alkaline metal $C_{8-20}$alkylsulfates typified by sodium lauryl sulfate, and alkaline metal $C_{8-20}$alkylbenzenesulfonates typified by sodium dodecylbenzenesulfonate.

The amount of the emulsifying agent to be used is, on a solid matter basis, about 0.1 to 20 parts by weight (e.g., 1 to 20 parts by weight), preferably about 1 to 15 parts by weight, and more preferably about 3 to 10 parts by weight relative to 100 parts by weight of the polyurethane prepolymer.

In the case of a polyurethane prepolymer having a hydrophilic group, its aqueous dispersion can be prepared by, for example, introducing a hydrophilic group into the polyurethane prepolymer through a reaction of an isocyanate compound with a hydrophilic compound as at least part of the diol component (or diamine component), dispersing the resultant polyurethane prepolymer in water, and then extending the chain using a diamine as a chain-extending agent. Exemplified as the hydrophilic group are ionic dissociation groups (e.g., carboxyl group, sulfonic acid group, sulfonate group, carbamoyl sulfonate group, quaternary amino group), and nonionic groups [e.g., polyoxyalkylene groups (e.g., polyoxyethylene group), epoxy group]. Of these, anionic groups (e.g., carboxyl group, sulfonic acid group, sulfonate group, carbamoyl sulfonate group), and nonionic groups (polyoxyethylene group) are preferred, with anionic groups (carboxyl group, sulfonic acid group) particularly preferred. Moreover, for dissolving or dispersing the prepolymer into which a anionic hydrophilic group such as carboxyl group or sulfonic acid group has been introduced, it is preferred that the chain is extended after the anionic group has been neutralized by a neutralizer.

The hydrophilic compound has a hydrophilic group and a reactive group reactive to the isocyanate group within its molecule. Groups reactive to the isocyanate group include hydroxyl group, amino group, and mercapto group. Exemplified as the hydrophilic compound are dihydroxycarboxylic acids (e.g., dihydroxy $C_{2-10}$carboxylic acids such as 2,2-dimethylol propionic acid, 2,2-dimethylol butyric acid, and 2,2-dimethylol valeric acid; dihydroxy $C_{4-10}$polycarboxylic acids such as dioxymaleic acid; dihydroxy aromatic carboxylic acids such as 2,6-dihydroxybenzoic acid); diaminocarboxylic acids (e.g., diamino aromatic carboxylic acids such as 3,4-diamino benzoic acid); carboxyl group-containing compounds as reaction products of acid anhydrides (e.g., maleic anhydride, phthalic anhydride, succinic anhydride, trimellitic anhydride, pyromellitic anhydride) with compounds having a group reactive to the isocyanate group (e.g., dihydroxy compounds such as diols, and diamines), or polyols of oligo esters obtained by copolymerization of these carboxyl group-containing compounds; sulfonic acid group-containing compounds such as oxysulfonic acids (e.g., 2-oxyethanesulfonic acid, phenolsulfonic acid), sulfocarboxylic acids (e.g., sulfobenzoic acid, sulfosuccinic acid, 5-sulfoisophthalic acid), and amino group-containing sulfonic acids (e.g., sulfanilic acid, 1,3-phenylenediamine-4,6-disulfonic acid, 2,4-diaminotoluene-5-sulfonic acid), or polyols of oligo esters obtained by copolymerizing these sulfonic acid group-containing compounds; polyoxy $C_{2-4}$alkylene compounds containing a group reactive to the isocyanate group (e.g., compounds containing 30% by weight or more of the ethylene oxide unit and a number average molecular weight of about 300 to 10,000), or polyols of oligo ester ethers obtained by copolymerizing these polyoxyalkylene compounds. These hydrophilic compounds can be used either singly or in combination.

The proportion of the hydrophilic compound can be selected within the range of about 1 to 100 mol %, preferably about 5 to 70 mol % (e.g., about 5 to 50 mol %), and more preferably about 10 to 40 mol % relative to the amount of the diol and/or diamine component.

The neutralizer can be selected according to the species of the hydrophilic group. When the hydrophilic group is an anionic group, the neutralizer is, for example, an inorganic base (e.g., alkaline metal hydroxides such as sodium hydroxide and potassium hydroxide; alkaline earth meal hydroxides such as calcium hydroxide and magnesium hydroxide; alkaline metal carbonates such as sodium carbonate and potassium carbonate; alkaline metal hydrogencarbonates such as sodium hydrogencarbonate; and ammonium), an organic base (e.g., mono-, di-, or triC$_{1-}$ $_4$alkylamines such as trimethylamine and triethylamine; mono-, di-, or tri$C_{1-4}$alkanolamines such as monoethanolamine, diethanolamine, and triethanolamine). These neutralizers can be used either singly or in combination.

In view of gas barrier properties and water resistance, the aqueous dispersion of the polyurethane resin is preferred to be a soap-free resin containing no free surfactant (e.g., an aqueous dispersion obtained by dispersing a prepolymer into which the aforementioned hydrophilic group has been introduced and then extending the chain).

The solvent for the aqueous dispersion is not limited to unmingled water, and may be a mixed solvent of water and a water-soluble solvent (e.g., $C_{1-4}$alcohols such as methanol, ethanol, and isopropanol; ketones such as acetone; and cellosolves). Incidentally, in preparing the aqueous dispersion, the organic solvent can be replaced with water by a conventional method, such as a process in which replacement of the organic solvent with water is effected by evaporation of the organic solvent.

[Properties of Polyurethane Resin]

(Urethane-Group Concentration and Urea Group Concentration)

In the polyurethane resin of the present invention, the total concentration of the urethane group and the urea group is about 15% by weight or more (e.g., 20 to 60% by weight), preferably about 20% by weight or more (e.g., 30 to 60% by weight), and more preferably about 35 to 60% by weight (e.g., 35 to 55% by weight). Making the sum of the urethane and urea concentrations 15% by weight or greater enhances the cohesive force of the resin, enabling the resin to exhibit good gas barrier properties.

The urethane group concentration and the urea group concentration are values each obtained by dividing the molecular weight of urethane group (59 g/equivalent) or that of urea group (58 g/equivalent) by the molecular weight of the repeating unit.

(Oxygen Permeability)

The oxygen permeability of the polyurethane resin is, for example, at a thickness of 25 $\mu$m, about 50 ml/m$^2$·atm·day or less, preferably 20 ml/m$^2$·atm·day or less, and more preferably about 0.1 to 10 ml/m$^2$·atm·day, hence excellent gas barrier properties.

The polyurethane resin of the present invention is not so humidity-dependent, and the ratio of the oxygen permeability at 50% RH to that at 90% RH is about 1/1 to 1/2, preferably about 1/1 to 1/1.5, and more preferably about 1/1 to 1/1.25. Therefore, the resin of the present invention is hardly affected by humidity and exhibits excellent gas barrier properties even under high humidity.

(Structure)

It is preferred that the repeating unit of the polyurethane resin contains an aromatic or non-aromatic hydrocarbon ring unit, for example, the repeating unit of an aromatic or alicyclic compound. Although the aromatic or alicyclic compound is usually a compound derived from the diisocyanate component, it may be one derived from the diol component. The proportion of the hydrocarbon ring unit in the repeating unit of the polyurethane resin is about 10 to 70% by weight, preferably about 15 to 65% by weight, and more preferably about 20 to 60% by weight.

That the polyurethane resin contains, of all the constitutive units, 30 mol % or more, preferably 50 mol % or more, and more preferably 70 mol % or more of the repeating unit constituted of a diisocyanate component (particularly, an aromatic diisocyanate) and a diol component (particularly, a $C_{2-8}$alkylene glycol) is suitable. Still in this case, if an aromatic diol (or a diamine) such as xylylene diol (or diamine) is used as the diol component (or the diol and diamine components) and a low-molecular diisocyanate such as HDI as the diisocyanate component, the same effects will be obtained.

A terminal group of the polyurethane resin may be a hydroxyl group or an isocyanate group, and either will do. In the case of a polyurethane resin having a hydroxyl group at its terminal end, such resin is suitable as a thermoplastic molding material, and a polyurethane resin with an isocyanate group at its terminal end shows improved adhesion when coated on a base film, and post-curing due to moisture can be expected.

(Average Molecular Weight)

The number average molecular weight of the polyurethane resin can be selected within the range of about 800 to 1,000,000, preferably about 800 to 200,000, and more preferably about 800 to 100,000. Adjusting the molecular weight of the polyurethane resin to 800 or larger can raise the strength of the resin to a sufficient level for the use as a shaped article such as a film. Moreover, the polyurethane resin itself, when coated on a base film, acquires the cohesive force by being adjusted to 800 or larger in number average molecular weight, which translates that film-making becomes easier. On the other hand, the molecular weight adjusted to 1,000,000 or smaller keeps the viscosity of the polyurethane resin low even if the resin is in a solvent, leading to ease in coating or lamination.

(Crystallinity)

Polyurethane resins of high crystallinity have excellent gas barrier properties. In addition, the glass transition temperature of the polyurethane resin is 100° C. or higher (e.g., about 100 to 200° C.), more preferably 110° C. or higher (e.g., about 110 to 180° C.), and more preferably about 120° C. or higher (e.g., about 120 to 150° C.). Raising the glass transition temperature to 100° C. or higher leads to improved gas barrier properties.

[Optional Components]

(Thermoplastic Resin)

The polyurethane resin can optionally be blended with a thermoplastic resin unless the gas barrier characteristics of the polyurethane resin is adversely affected. As the thermoplastic resin, there may be mentioned, for example, polyolefinic resins (e.g., (polyethylene, polypropylene, polybutene, polymethylpentene); polyester-series resins (e.g., polyethylene terephthalate, polybutylene terephthalate); polyamide-series resins (e.g., nylon 6, nylon 12, nylon 66, polymethaxylyleneadipamide); vinyl-series resins (e.g., polystyrene, polyvinyl chloride, polymethyl methacrylate); and polycarbonate-series resins (e.g., bisphenol A-based polycaronbate). Moreover, if necessary, the polyurethane resin of the present invention can be used together with a gas barrier resin(s), such as PVDC, polyvinyl alcohol, ethylene-vinyl alcohol copolymer, and others.

(Additives)

If necessary, to the polyurethane resin may be added a variety of additives unless the gas barrier properties of the resin are adversely affected, and examples of which are silane coupling agents, layered inorganic compounds, stabilizers (e.g., antioxidants, thermostabilizers, ultraviolet ray absorbers), plasticizers, antistatic agents, lubricants, blocking inhibitors, coloring agents, fillers, nucleators, etc.

Particularly, the silane coupling agent is effective for improving the adhesion of the gas barrier polyurethane resin to a base material, and examples of which are hydrolytic alkoxysilane compounds, such as halogen-containing alkoxysilanes (chloroC$_{2-4}$alkytriC$_{1-4}$alkoxysilanes such as 2-chloroethyltrimethoxysilane, 2-chloroethyltriethoxysilane, 3-chloropropyltrimethoxysilane, and 3-chloropropyltriethoxysilane); epoxy group-containing alkoxysilanes [glycidyloxyC$_{2-4}$alkytriC$_{1-4}$alkoxysilanes such as 2-glycidyloxyethyltrimethoxysilane, 2-glycidyloxyethyltriethoxysilane, 3-glycidyloxypropyltrimethoxysilane, and 3-glycidyloxypropyltriethoxysilane; glycidyloxydiC$_{2-4}$alkyldiC$_{1-4}$alkoxysilanes such as 3-glycidyloxypropylmethyldimethoxysilane, and 3-glycidyloxypropylmethyldiethoxysilane; and (epoxycycloalkyl)C$_{2-4}$alkyltriC$_{1-4}$alkoxysilanes such as 2-(3,4-epoxycyclohexyl)ethyltrimethoxysilane, 2-(3,4-epoxycyclohexyl)ethyltriethoxysilane, and 3-(3,4-epoxycyclohexyl)propyltrimethoxysilane]; amino group-containing alkoxysilanes [aminoC$_{2-4}$alkyltriC$_{1-4}$alkoxysilanes such as 2-aminoethyltrimethoxysilane, 3-aminopropyltrimethoxysilane, and 3-aminopropyltriethoxysilane; aminodiC$_{2-4}$alkyldiC$_{1-4}$alkoxysilanes such as 3-aminopropylmethyldimethoxysilane, and 3-aminopropylmethyldiethoxysilane; (2-aminoC$_{2-4}$alkyl)aminoC$_{2-4}$alkyltriC$_{1-4}$alkoxysilanes such as 2-[N-(2-aminoethyl)amino]ethyltrimethoxysilane, 3-[N-(2-aminoethyl)amino]propyltrimethoxysilane, and 3-[N-(2-aminoethyl)amino]propyltriethoxysilane; and (aminoC$_{2-4}$alkyl)aminodiC$_{2-4}$alkyldiC$_{1-4}$alkoxysilanes such as 3-[N-(2-aminoethyl)amino]propylmethyldimethoxysilane, and 3-[N-2-aminoethyl)amino]propylmethyldiethoxysilane]; mercapto group-containing alkoxysilanes (e.g., mercaptoC$_{2-4}$alkyltriC$_{1-4}$alkoxysilanes such as 2-mercaptoethyltrimethoxysilane, 3-mercaptopropyltrimethoxysilane, and 3-mercaptopropyltriethoxysilane; and mercaptodiC$_{2-4}$alkyldiC$_{1-4}$alkoxysilanes such as 3-mercaptopropylmethyldimethoxysilane and 3-mercaptopropylmethyldiethoxysilane); vinyl group-containing alkoxysilanes (e.g., vinyl triC$_{1-4}$alkoxysilanes such as vinyl trimethoxysilane and vinyl triethoxysilane); and alkoxysilanes having an ethylenically unsaturated bond group (e.g., (meth)acryloxyC$_{2-4}$alkyltriC$_{1-4}$alkoxysilanes such as 2-(meth)acryloxyethyltrimethoxysilane, 2-(meth)acryloxyethyltriethoxysilane, 3-(meth)acryloxypropyltrimethoxysilane, and 3-(meth)acryloxypropyltriethoxysialne; and (meth)acryloxydiC$_{2-4}$alkyldiC$_{1-4}$alkoxysilanes such as 3-(meth)acryloxypropylmethyldimethoxysilane and 3-(meth)acryloxypropylmethyldiethoxysilane). These silane coupling agents can be used either singly or in combination.

The proportion of the silane coupling agent is, relative to 100 parts by weight of the polyurethane resin, about 30 parts by weight or less (e.g., 0.1 to 30 parts by weight), preferably about 0.5 to 20 parts by weight, and more preferably about 1 to 10 parts by weight.

Moreover, layered inorganic compounds are effective for improving the gas barrier properties of the polyurethane resin. If the polyurethane resin is one dissolved or dispersed in a solvent and incorporating a layered inorganic compound which is swollen with the solvent, the polyurethane resin permeates into and impregnate the layers, improving the gas barrier properties. Thus, if a resin dispersed in water is to be used as the gas barrier polyurethane, the use of a water-swellable layered inorganic compound as the layered inorganic compound is preferable.

Exemplified as the layered inorganic compound are water-swellable hydrous silicates, such as smectite-series clay minerals (e.g., montmorillonite, beidellite, nontronite, saponite, hectorite, sauconite, stevensite), vermiculite-series clay minerals; kaolin-type minerals (e.g., halloysite, kaolinite, endellite), swellable micas (mica, taeniolite). Both natural and synthetic layered inorganic compounds will do. Of these layered inorganic compounds, smectite-series clay minerals, particularly montmorillonite, are preferred. These layered inorganic compounds can be used either singly or in combination.

The proportion of the layered inorganic compound is, relative to 100 parts by weight of the polyurethane resin, about 50 parts by weight or less (e.g., about 0.1 to 50 parts by weight), preferably about 1 to 40 parts by weight, and more preferably about 5 to 30 parts by weight.

[Shaped Article and Method of Shaping]

How the polyurethane resin is shaped into articles is not particularly restricted, either, and the polyurethane resin can be shaped by a variety of molding methods, such as melt-molding (a method in which a polyurethane resin is heated to or above its melting or softening point, and then the molten resin is shaped), solution-molding (e.g., a method in which a polyurethane resin-dissolved or dispersed solution is coated on a base and then dried; a method in which a polyurethane resin-dissolved solution is extruded into a poor solvent for the polyurethane resin), powder-molding (e.g., a method in which a powder is fed to a mold and heated, or a method in which a powder is blasted against a heated base). The polyurethane resin of the present invention is shaped into films or other articles through a molding method of those mentioned above.

The polyurethane resin may be used as a single-layered filmy article or a multi-layered article constituted of a base and a layer(s) formed thereon, depending on the intended use. The thickness of a single-layered film of the polyurethane resin is about 1 to 100 μm, preferably about 10 to 80 μm, and more preferably about 20 to 70 μm (e.g., 30 to 70 μm).

There is no particular restriction to the base of the multi-layered article, and the base may be plastic, paper, fabric, metal, ceramic, etc. Of these, it is preferred that the polyurethane resin is laminated on a base of a thermoplastic resin. Exemplified as the thermoplastic resin are polyolefinic resins (e.g., polyC$_{2-10}$olefinic resins such as polyethylene, polypropylene, propylene-ethylene copolymer), polyester-series resins (e.g., homo- or copolyesters the main constituent of which is alkylene arylate, such as polyethylene terephthalate and polybutylene terephthalate), polyamide-series resins (e.g., aliphatic polyamides such as nylon 6 and nylon 66; aromatic polyamides such as polymethaxylyleneadipamide), vinyl-series resins (e.g., aromatic vinyl-series resins such as polystyrene, polyvinyl acetates); acrylic resins (e.g., homo- or copolymers of (meth)acrylic monomers, such as polymethyl methacrylate and polyacrylonitrile), polycarbonate-series resins (e.g., bisphenol A-based polycarbonate), and cellulose-series resins (e.g., cellophane, cellulose acetate). A film shaped from a single molten resin or a mixed resin is usually employed as the base.

Included among the preferred base films are polyolefinic resin films (particularly, polypropylene-series resin films such as polypropylene and propylene-ethylene copolymer), polyester-series resin films (particularly, polyethylene terephthalate-series resin films), polyamide-series resin films [particularly, nylons (e.g., nylon 6, nylon 66)].

Such base film may be a non-stretched, uniaxially-oriented, or biaxially-oriented film. Additionally, the base film may be a multi-layered film constituted of a plurality of resin layers laminated on one another. The surface of the base film may be treated (e.g., corona discharge treatment, plasma discharge treatment and other discharge treatments, acid treatment, flame treatment), or the base film may previously be provided with an undercoat.

The thickness of the base film is about 1 to 100 μm, preferably about 5 to 50 μm, and more preferably about 10 to 30 μm.

The thickness of the polyurethane resin-containing coating layer is about 0.1 to 50 μm, preferably about 0.5 to 30 μm, and more preferably about 1 to 10 μm.

At least one side of the base film may be provided with an inorganic layer. The inorganic layer can be formed by vapor deposition or sputtering, or other means. Exemplified as the inorganic material forming the inorganic layer are elemental substances of, e.g., the Group 2A elements such as magnesium, transition metal elements such as titanium and zirconium, the Group 2B elements such as zinc, the Group 3B elements such as aluminum and indium, the Group 4B elements such as silicon and tin, and other elements of the Periodic Table of Elements; and inorganic compounds containing the above-mentioned element(s) (e.g., oxides, halides, carbides, nitrides). Of these inorganic substances, metal oxides [e.g., tin oxide, aluminum oxide (alumina), indium oxide, and compound oxides thereof] and silicon oxides (e.g., silicon monoxide, silicon dioxide) are preferred. The inorganic layer may be transparent, and the thickness is about 100 to 3,000 Å, preferably 200 to 2,000 Å, and more preferably about 300 to 1,500 Å.

The thickness of the coat layer in the case with the base film having the inorganic layer is about 0.1 to 20 μm, preferably about 0.3 to 10 μm, and more preferably about 0.5 to 5 μm. In addition to contribution to further improvement in gas barrier properties when used in combination with the inorganic layer, the polyurethane resin has a function of preventing the inorganic layer from cracking or suffering other defections. Although the coating layer can be formed on the base film, in view of protection of the inorganic layer, the coat layer is preferred to be formed on the inorganic layer.

The composite film need only comprise the base film layer and a resin layer at least containing the polyurethane resin, and there is no particular restriction. The composite film can be obtained by, for example, a co-extruding method or a coating method. For example, in the coating method, a composite film is fabricated by coating a polyurethane resin solution or an aqueous dispersion of the polyurethane resin on a base film in a conventional manner, and heating the coated film at 50° C. or higher, preferably about 70° C. or higher, for 5 seconds to 10 minutes, preferably about 10 seconds to 5 minutes. Moreover, if necessary, an adhesive layer may be provided between the polyurethane resin layer and the base film layer.

In the composite film, the polyurethane resin layer may be coated as an overcoating agent constituting the surface layer of the composite film, or as an anchor-coat agent applied between the base film layer and a resin layer, or between a plurality of resin layers. Moreover, if the polyurethane resin itself is adhesive, it may be coated for use as an adhesive.

[Effects of the Invention]

Without using a chlorine-containing compound which contaminates the environment, the present invention can provide a polyurethane resin with far excellent gas barrier properties, particularly a polyurethane resin which shows excellent gas barrier properties even under a condition of high humidity, and a film containing such polyurethane resin. Moreover, since the polyurethane resin of the present invention is excellent in adhesion to a base film as well as in water- and chemical-resistance, the polyurethane resin can be utilized in a variety of fields, such as the field of packaging materials or molding materials.

EXAMPLES

Hereinafter, the present invention will be described in further detail and should by no means be construed as defining the scope of the invention.

Production Example 1

Dimethyl sulfoxide (250 g), 168.5 g of 1,3-xylylene diisocyanate, and 81.5 g of 1,4-butanediol were mixed together and heated to 80° C. in an atmosphere of nitrogen with stirring thereby to cause a reaction. With the disappearance of the absorption attributed to the isocyanate group confirmed by infrared ray absorption spectrum, the urethane resin solution was poured into ethyl acetate. After filtering off the precipitates, the solution was washed with ethyl acetate well and then dried under reduced pressure. The yield of the resin produced was 98%. The urethane group concentration was 42 wt %, and the number average molecular weight was 27,650. This polyurethane resin powder was melt-molded at 200° C. and a pressure of $4.9 \times 10^6$ Pa to give a film 1 of 50 μm thick. Incidentally, a test specimen obtained by first melting the polyurethane resin powder (the temperature brought up to 200° C.) and then gradually cooling was examined using a differential scanning calorimeter (DSC) at a temperature elevation rate of 10° C./min. and confirmed to have a glass transition temperature of 136° C. and a crystal melting peak point at 163° C.

Production Example 2

N,N-dimethylformamide (250 g), 199.9 g of 4,4'-diphenylmethane diisocyanate, and 50.1 g of ethylene glycol were mixed together and heated to 80° C. in an atmosphere of nitrogen with stirring thereby to cause a reaction. With the disappearance of the absorption attributed to the isocyanate group confirmed by infrared ray absorption spectrum, this urethane resin solution was poured into ethyl acetate. After filtering off the precipitates, the solution was washed with ethyl acetate well and then dried under reduced pressure. The yield of the resin produced was 97%. The urethane group concentration was 38 wt %, and the number average molecular weight was 30,950. The glass transition temperature of the polyurethane resin measured by a differential scanning calorimeter (DSC) was 142° C. This polyurethane resin powder was melt-molded at 210° C. and a pressure of $4.9 \times 10^6$ Pa to give a film 2 of 50 μm thick.

Production Example 3

N,N-dimethylformamide (250 g), 154.7 g of 2,4-tolylene diisocyanate, and 95.3 g of diethylene glycol were mixed together and heated to 80° C. in an atmosphere of nitrogen with stirring thereby to cause a reaction. With the disappearance of the absorption attributed to the isocyanate group confirmed by infrared ray absorption spectrum, this urethane resin solution was poured into ethyl acetate. After filtering off the precipitates, the solution was washed with ethyl acetate well and then dried under reduced pressure. The yield of the resin produced was 97%. The urethane group concentration was 42 wt %, and the number average molecular weight was 27,870. The glass transition temperature of this polyurethane resin measured by a differential scanning calorimeter (DSC) was 110° C. The polyurethane powder was melt-molded at a temperature of 190° C. and a pressure of $4.9 \times 10^6$ Pa to give a film 3 of 50 µm thick.

Production Example 4

Tetrahydrofuran (350 g), 91.1 g of 2,4-tolylene diisocyanate, and 58.9 g of 1,6-hexanediol were mixed together and reacted with stirring at 60° C. in an atmosphere of nitrogen for 8 hours. The concentration of urethane group of the polyurethane resin thus obtained was 40 wt %, and the number average molecular weight was 6,020. This polyurethane resin solution was coated on a biaxially oriented polypropylene film of 20 µm thick and dried at 100° C. for 20 seconds to give a laminated film 4 of 25 µm thick. Incidentally, with the coat of the polyurethane resin solution air-dried and completely removed of the solvent by pressure reduction, the glass transition temperature of the polyurethane resin was measured by a scanning differential thermal analyzer (DSC) and found to be 102° C.

Production Example 5

Methyl ethyl ketone (350 g), 91.1 g of a mixture of 2,4-tolylene diisocyanate and 2,6-tolylene diisocyanate [the former/the latter=80/20 (weight ratio)], and 58.9 g of 3-methyl-1,5-pentanediol were mixed together and reacted with stirring at 75° C. in an atmosphere of nitrogen for 10 hours. The urethane group concentration of the polyurethane resin thus obtained was 40% by weight, and the number average molecular weight was 6,020. The polyurethane resin solution was coated on a biaxially oriented polypropylene film of 20 µm thick and dried at 100° C. for 20 seconds to give a laminated film 5 of 25 µm thick. Incidentally, with the coat of the polyurethane resin solution air-dried and completely removed of the solvent by pressure reduction, the glass transition temperature of the polyurethane resin was measured by a differential scanning calorimeter (DSC) and found to be 102° C.

Production Example 6

Methyl ethyl ketone (200 g), 150 g of toluene, 118.5 g of isophorone diisocyanate, and 31.5 g of ethylene glycol were mixed together and reacted with stirring at 75° C. in an atmosphere of nitrogen for 12 hours. The urethane group concentration of the polyurethane resin thus obtained was 42% by weight, and the number average molecular weight was 5,910. This polyurethane resin solution was coated on a biaxially oriented polyethylene terephthalate film of 12 µm thick and dried at 150° C. for 20 seconds to give a laminated film 6 of 20 µm thick. Incidentally, with the coat of the polyurethane resin solution air-dried and completely removed of the solvent by pressure reduction, the glass transition temperature of the polyurethane resin was measured by a differential scanning calorimeter (DSC) and found to be 122° C.

Production Example 7

1,3-xylylene diisocyanate (188.2 g) and 75.1 g of triethylene glycol were mixed together and reacted with stirring at 80° C. in an atmosphere of nitrogen for 2 hours. 210 g of the prepolymer thus obtained was emulsified by a phase inversion method using 490 g of 3% by weight polyvinyl alcohol aqueous solution (polyvinyl alcohol manufactured by Kuraray Co., Ltd., PVA 210). Thereafter, to the emulsified liquid was gradually added 31.7 g of tetramethylenediamine (1,4-diaminobutane) to cause a chain-extending reaction, providing an aqueous dispersion of the polyurethane resin. The total concentration of the urethane group and the urea group was 38% by weight, and the number average molecualr weight was 26,770. This polyurethane resin aqueous dispersion was coated on a biaxially oriented polypropylene film of 20 µm thick, and dried at 120° C. for 20 seconds to give a laminated film 7 of 25 µm thick. Incidentally, with the coat of the polyurethane resin aqueous dispersion air-dried and completely removed of moisture by pressure reduction, the glass transition temperature of the polyurethane resin was measured by a differential scanning calorimeter (DSC) and found to be 132° C.

Production Example 8

Hydrogenated XDI (1,4-bis(isocyanatemethyl)cyclohexane) (341.1 g), 58.9 g of dimethylol propionic acid, 54.4 g of ethylene glycol, and 210 g of acetonitrile as a solvent were mixed together and reacted at 70° C. in an atmosphere of nitrogen for 3 hours. This carboxylic acid group-containing polyurethane prepolymer solution was then neutralized at 50° C. using 35.5 g of triethylamine. An aqueous dispersion of the polyurethane resin with a solid content of 25% by weight was prepared by dispersing 300 g of the polyurethane prepolymer solution in 660 g of water by means of a Homodisper, carrying out a chain-extending reaction using 10.2 g of ethylenediamine, and evaporating off the acetonitrile. The total concentration of the urethane group and the urea group of the polyurethane resin was 42.9% by weight, and the number average molecular weight was 68,000. This polyurethane resin aqueous dispersion was coated on a biaxially oriented polypropylene film of 20 µm thick, and dried at 120° C. for 20 seconds to give a laminated film 8 of 25 µm thick. Incidentally, with the coat of the polyurethane resin aqueous dispersion air-dried and completely removed of moisture by pressure reduction, the glass transition temperature of the polyurethane resin was measured by a differential scanning calorimeter (DSC) and found to be 121° C.

Production Example 9

Hydrogenated XDI (1,4-bis(isocyanatemethyl)cyclohexane) (439.1 g), 35.4 g of dimethylol propionic acid, 61.5 g of ethylene glycol, and 140 g of acetonitrile as a solvent were mixed together and reacted at 70° C. in an atmosphere of nitrogen for 3 hours. This carboxylic acid group-containing polyurethane prepolymer solution was then neutralized at 50° C. using 24.0 g of triethylamine. An aqueous dispersion of the polyurethane resin with a solid content of 25% by weight was prepared by dispersing 267.9 g of the polyurethane prepolymer solution in 750 g of water by means of a Homodisper, carrying out a chain-extending reaction using 35.7 g of 2-[(2-aminoethyl)amino]ethanol, and evaporating off the acetonitrile. The total concentration of the urethane group and the urea group of the polyurethane resin was 41.1% by weight, and the number average molecular weight was 72,000. This polyurethane resin aqueous dispersion was coated on a biaxially oriented polypropylene film of 20 µm thick, and dried at 120° C. for 20 seconds to give a laminated film 9 of 25 µm thick. Incidentally, with the coat of the polyurethane resin aqueous dispersion air-dried and completely removed of moisture by pressure reduction, the glass transition temperature of the polyurethane resin was measured by a differential scanning calorimeter (DSC) and found to be 121° C.

Production Example 10

A coating fluid, or a mixture of 500 g of the polyurethane resin aqueous dispersion obtained in Production Example 9 and 6 g of 3-[N-(2-aminoethyl)amino]propylmethyldimethoxysilane (Sinetsu Kagaku, K.K., KBM-602), was coated on a biaxially-oriented polypropylene film of 20 μm thick and dried at 120° C. for 20 seconds to give a laminated film 10 of 25 μm thick.

Production Example 11

Hydrogenated XDI (1,4-bis(isocyanatemethyl)cyclohexane) (399.7 g), 35.3 g of dimethylol propionic acid, 93.5 g of diethylene glycol, and 97.5 g of acetonitrile as a solvent were mixed together and reacted at 70° C. in an atmosphere of nitrogen for 3 hours. This carboxylic acid group-containing polyurethane prepolymer solution was then neutralized at 50° C. using 24.0 g of triethylamine. 274.1 g of the polyurethane prepolymer solution was dispersed in 937.5 g of water by means of a Homodisper, and then 62.5 g of layered inorganic compound montmorillonite was dispersed in the resultant mixture. An aqueous dispersion of the polyurethane resin with a solid content of 25% by weight was obtained by carrying out the chain-extending reaction of this layered inorganic compound-containing polyurethane polymer aqueous dispersion using 17.0 g of a hydrazine-hydrate, and evaporating off the acetonitrile. The total concentration of the urethane group and the urea group of the polyurethane resin was 42.3% by weight, and the number average molecular weight was 75,000. This polyurethane resin aqueous dispersion was coated on a biaxially oriented polypropylene film of 20 μm thick, and dried at 120° C. for 20 seconds to give a laminated film 11 of 25 μm thick. Incidentally, with the coat of the polyurethane resin aqueous dispersion air-dried and completely removed of moisture by pressure reduction, the glass transition temperature of the polyurethane resin was measured by a differential scanning calorimeter (DSC) and found to be 125° C.

Production Example 12

The polyurethane resin aqueous dispersion obtained in Production Example 9 was coated on an alumina transparent-deposited polyethylene terephthalate film (12 μm thick), and dried at 130° C. for 30 seconds to give a laminated film 12 of 13 μm thick.

Example

The gas barrier properties of each of the films 1 to 12 were measured using an oxygen permeability measuring device (manufactured by Modern Control, Co., Ltd., MOCON OXTRAN 10/50A) under conditions of 20° C., and 50% RH and 90% RH. The results are shown in Table 1. The oxygen permeability of each of the films 1 to 11 is a value converted on the assumption that a polyurethane film is of 25 μm thick. The oxygen permeability of the film 12 is a value of the laminated film itself. For comparison, the same measurements were made for a biaxially oriented polypropylene film (OPP) of 20 μm thick and a biaxially oriented polyethylene terephthalate film (OPET) of 12 μm thick. The results are shown in Table 1.

TABLE 1

| | Oxygen Permeability (50% RH) (ml/m$^2$ · atm · day) | Oxygen Permeability (90% RH) (ml/m$^2$ · atm · day) |
|---|---|---|
| Ex. | | |
| Film 1 | 2.4 | 2.6 |
| Film 2 | 3.3 | 3.7 |
| Film 3 | 3.9 | 4.9 |
| Laminated Film 4 | 28.0 | 32.2 |
| Laminated Film 5 | 20.5 | 23.5 |
| Laminated Film 6 | 12.7 | 14.2 |
| Laminated Film 7 | 7.9 | 8.3 |
| Laminated Film 8 | 10.0 | 12.0 |
| Laminated Film 9 | 4.5 | 6.7 |
| Laminated Film 10 | 3.8 | 5.7 |
| Laminated Film 11 | 4.0 | 4.9 |
| Laminated Film 12 | 0.5 | 0.9 |
| Comp. Ex. | | |
| OPP | 1,700 | 1,800 |
| OPET | 120 | 150 |

What is claimed is:

1. An aqueous dispersion comprising a gas barrier polyurethane resin, wherein the polyurethane resin comprises a plurality of urea groups and a plurality of urethane groups, wherein the polyurethane resin has a total concentration of urea groups and urethane groups of 30 to 42.9% by weight based upon the total weight of the polyurethane resin, wherein the polyurethane resin comprises a diisocyanate selected from the group consisting of an aromatic diisocyanate, an araliphatic diisocyanate, and an alicyclic diisocyanate, a $C_{2-8}$ diol and a diamine having 8 or less carbon atoms, wherein the polyurethane resin has a glass transition temperature of 100° C. or higher.

2. The aqueous dispersion according to claim 1, wherein the polyurethane resin has a number average molecular weight of 800 to 1,000,000.

3. The aqueous dispersion according to claim 1, wherein the $C_{2-8}$ diol comprises a $C_{2-8}$ alkylene glycol.

4. The aqueous dispersion according to claim 1, wherein the diisocyanate is selected from the group consisting of xylylene diisocyanate and hydrogenated xylylene diisocyanate.

5. The aqueous dispersion according to claim 1, wherein the proportion of the hydrocarbon ring unit in the polyurethane resin is 10 to 70% by weight based upon the total weight of the polyurethane resin.

6. The aqueous dispersion according to claim 1, which further comprises at least one member selected from the group consisting of a silane coupling agent and a layered inorganic compound.

7. The aqueous dispersion according to claim 6, wherein the proportion of the silane coupling agent is 0.1 to 30 parts by weight, if presents, and the proportion of the layered inorganic compound is 0.1 to 50 parts by weight, if presents, relative to 100 parts by weight of the polyurethane resin.

8. The aqueous dispersion according to claim 7, wherein the layered inorganic compound is water-swellable.

9. A gas barrier composite film, comprising a base film layer and a resin layer formed on at least one side of the base film layer, wherein the base film layer is formed with at least one member selected from the group consisting of a plastic, a paper, a fabric, a metal and a ceramic, and the resin layer is formed from an aqueous dispersion recited in claim 1.

10. A gas barrier composite film, comprising a base film layer formed with at least one member selected from the group consisting of a plastic, a paper, a fabric, a metal and a ceramic, an inorganic layer and a resin layer formed from an aqueous dispersion recited in claim 1, wherein the inorganic layer is formed on the base layer, and the resin layer is formed on the inorganic layer.

11. A gas barrier composite film, comprising a base film layer formed with at least one member selected from the group consisting of a plastic, a paper, a fabric, a metal and a ceramic, a resin layer formed from an aqueous dispersion recited in claim 1, and an inorganic layer, wherein the resin layer is formed on the base layer, and the inorganic layer is formed on the resin layer.

* * * * *